(12) United States Patent
Ishizuka et al.

(10) Patent No.: US 12,318,940 B2
(45) Date of Patent: Jun. 3, 2025

(54) ROBOT CONTROL SYSTEM

(71) Applicant: Sony Interactive Entertainment Inc., Tokyo (JP)

(72) Inventors: Kensaku Ishizuka, Tokyo (JP); Taeko Inagawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 531 days.

(21) Appl. No.: 17/614,770

(22) PCT Filed: Jun. 10, 2020

(86) PCT No.: PCT/JP2020/022802
§ 371 (c)(1),
(2) Date: Nov. 29, 2021

(87) PCT Pub. No.: WO2020/255813
PCT Pub. Date: Dec. 24, 2020

(65) Prior Publication Data
US 2022/0226996 A1 Jul. 21, 2022

(30) Foreign Application Priority Data
Jun. 17, 2019 (JP) .................. 2019-112101

(51) Int. Cl.
*B25J 9/16* (2006.01)
*A63H 11/18* (2006.01)

(52) U.S. Cl.
CPC ............ *B25J 9/1664* (2013.01); *A63H 11/18* (2013.01); *B25J 9/1697* (2013.01)

(58) Field of Classification Search
CPC ....... A63H 11/18; B25J 9/1664; B25J 9/1697; B25J 19/023; B62D 57/032;
(Continued)

(56) References Cited

U.S. PATENT DOCUMENTS 5,369,346 A * 11/1994 Takahashi ............ B62D 57/032
318/568.17
5,426,586 A * 6/1995 Ozawa ................ B62D 57/032
414/730
(Continued)

FOREIGN PATENT DOCUMENTS

CN          100556623 C  * 11/2009  ............ B25J 9/0003
CN          106078752 A  * 11/2016  .............. B25J 19/00
(Continued)

OTHER PUBLICATIONS

CN-100556623-C translation (Year: 2009).*
(Continued)

*Primary Examiner* — Kyle T Johnson
(74) *Attorney, Agent, or Firm* — Kilpatrick Townsend & Stockton LLP

(57) ABSTRACT

A posture estimating circuit acquires image data in which images of a person are recorded, to estimate a posture of the person. A motion control circuit controls the motion of a robot device on the basis of a result of estimation by the posture estimating circuit. A first motion control circuit synchronizes a posture of the upper body of the robot device with a posture of the upper body of the person estimated by the posture estimating circuit. A second motion control circuit carries out a stabilization control of the lower body of the robot device.

13 Claims, 10 Drawing Sheets

(58) Field of Classification Search
CPC .......... G05B 2219/40264; G06T 2207/20084; G06T 2207/30196; G06T 7/75; G01B 11/24

See application file for complete search history.

(56) References Cited

U.S. PATENT DOCUMENTS

| | | | |
|---|---|---|---|
| 7,689,322 B2 | 3/2010 | Tanaka | |
| 9,047,507 B2* | 6/2015 | Gurman | G06V 40/10 |
| 9,798,935 B2* | 10/2017 | Sandahl | G06T 7/60 |
| 10,899,005 B2 | 1/2021 | Hayaishi | |
| 2005/0033475 A1* | 2/2005 | Kuroki | B62D 57/032 |
| | | | 318/568.12 |
| 2006/0020368 A1* | 1/2006 | Tanaka | B25J 9/161 |
| | | | 700/259 |
| 2011/0302293 A1* | 12/2011 | Buban | G06V 40/20 |
| | | | 709/227 |
| 2014/0334670 A1* | 11/2014 | Guigues | G06V 10/426 |
| | | | 382/103 |
| 2015/0202768 A1* | 7/2015 | Moridaira | B62D 57/032 |
| | | | 901/1 |
| 2015/0325004 A1* | 11/2015 | Utsunomiya | G06V 40/25 |
| | | | 382/103 |
| 2016/0059412 A1* | 3/2016 | Oleynik | B25J 19/02 |
| | | | 700/250 |
| 2018/0158196 A1* | 6/2018 | Marks | G06V 40/23 |
| 2019/0122436 A1* | 4/2019 | Bashkirov | G06F 3/011 |
| 2020/0180156 A1* | 6/2020 | Hayaishi | B25J 9/1666 |
| 2021/0197384 A1* | 7/2021 | Lin | B25J 9/04 |
| 2021/0387346 A1* | 12/2021 | Gillett | B25J 19/0075 |
| 2022/0226996 A1* | 7/2022 | Ishizuka | G06T 7/75 |
| 2022/0305654 A1* | 9/2022 | Ishizuka | B25J 9/1697 |
| 2024/0001251 A1* | 1/2024 | Kariya | B25J 13/088 |

FOREIGN PATENT DOCUMENTS

| | | | | |
|---|---|---|---|---|
| CN | 106985140 A | * | 7/2017 | .............. B25J 13/00 |
| CN | 111230877 A | * | 6/2020 | .............. B25J 11/00 |
| JP | 2003117858 A | | 4/2003 | |
| JP | 2005335033 A | * | 12/2005 | |
| JP | 2005342873 A | | 12/2005 | |
| JP | 7064513 B2 | * | 5/2022 | .............. B25J 9/163 |
| WO | WO-0245913 A1 | * | 6/2002 | ................ B25J 5/00 |
| WO | 2017086364 A1 | | 5/2017 | |

OTHER PUBLICATIONS

CN-106078752-A translation (Year: 2016).*
Zhang NPL, already provided but provided again for page numbers (Year: 2016).*
JP-2005335033-A translation (Year: 2005).*
JP-7064513-B2 translation (Year: 2022).*
WO-0245913-A1 translation (Year: 2002).*
CN-106985140-A translation (Year: 2017).*
CN-111230877-A translation (Year: 2020).*
Robot_learning_from_demonstration_in_robotic_assembly (Year: 2018).*
International Search Report for corresponding PCT Application No. PCT/JP2020/022802, 11 pages, dated Aug. 25, 2020.
Extended European Search Report for corresponding EP Application No. 20825874.9, 9 pages dated Jun. 22, 2023.
Zhang Liang, et al; "Fast human whole body motion imitation algorithm for humanoid robots", 2016 IEEE International Conference on Robotics and Biomimetics (ROBIO), IEEE pp. 1430-1435, Dec. 3, 2016 (For relevancy see Non-Pat. Lit. #1).

* cited by examiner (a)

108

(b)

108

(a)

(b)

ROBOT CONTROL SYSTEM

TECHNICAL FIELD

The present invention relates to a technique for controlling the motion of a robot device.

BACKGROUND ART

Research and development of various types of robots are being carried out. PTL 1 discloses a robot device including a module that generates a movement synchronized with a user's movement, according to user's images received as input via a camera image input device.

CITATION LIST PATENT LITERATURE

[PTL 1] JP 2005-342873A

SUMMARY TECHNICAL PROBLEM

"Pet-type" robots that imitate the body mechanisms and movements of animals walking on four legs and "human-type" robots that imitate the body mechanisms and movements of humans walking upright on two legs have been put into practical use. Robot devices that perform entertainment-focused operations are called "entertainment robots" and are commercially available.

The entertainment robots provide actions that entertain users, by their nature. As one of such actions, in PTL 1, a robot device is provided with a module that achieves synchronized movement that imitates a user's movement. The present inventors paid attention to the possibility of an entertainment robot having a function of synchronizing with a user's movement and have devised a mechanism for effectively achieving the synchronized movement.

Solution to Problem

In order to solve the above problem, one aspect of the present invention is a system that controls a robot device having an upper body and a lower body. The lower body includes a lumbar part and a plurality of movable legs. The system includes a posture estimating section that acquires image data in which an image of a person is recorded, and estimates a posture of the person; and a motion control section that controls a motion of the robot device on the basis of an estimation result of the posture estimating section. The motion control section includes a first motion control section that synchronizes a posture of the upper body of the robot device with a posture of an upper body of the person estimated by the posture estimating section, and a second motion control section that controls and stabilizes the lower body of the robot device.

It should be noted that any combination of the above components and the expression of the present invention converted between a method, a device, a system, a computer program, a recording medium recording the computer program readably, a data structure, and the like are also effective as an aspect of the present invention.

DESCRIPTION OF EMBODIMENT

Figure 1:
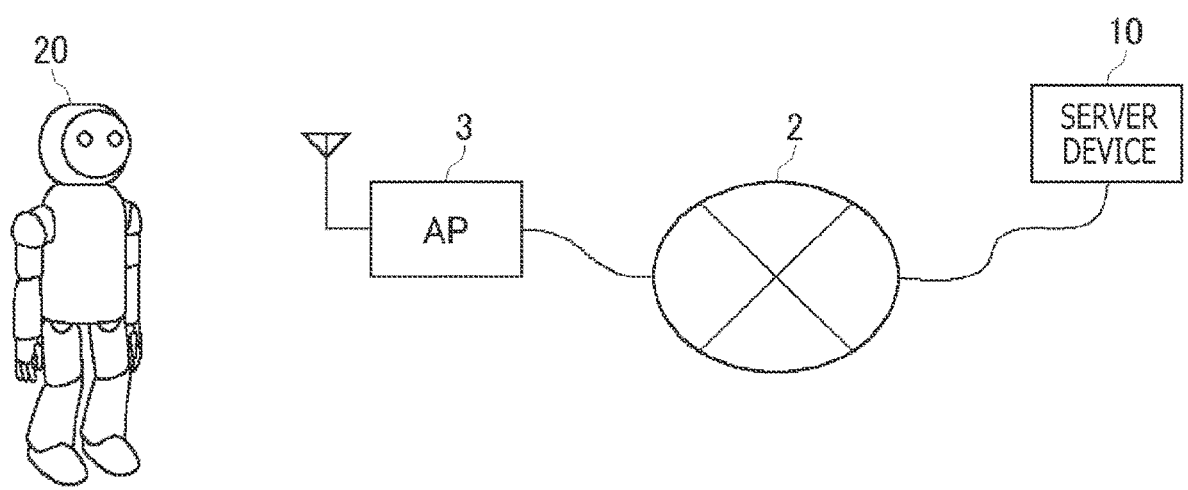
FIG. 1 is a diagram illustrating a schematic configuration of an information processing system of an embodiment.

FIG. 1 illustrates a schematic configuration of an information processing system 1 of an embodiment. The information processing system 1 includes a robot device 20 and a server device 10. The robot device 20 is a mobile body that is capable of autonomous movement, and is communicably connected to the server device 10 through a network 2 such as the Internet via an access point (AP) 3.

The robot device 20 is a robot having an upper body and a lower body that includes a lumbar part and a plurality of movable legs, and is owned by a user as an owner. In the embodiment, the robot device 20 includes two movable legs and has a synchronization function of imitating a movement of the user by capturing images of the movement of the user with a camera. It is preferable that the robot device 20 can recognize the user through face authentication by an image analysis, voiceprint authentication by a voice analysis, or other authentication. By recognizing the user, the robot device 20 can receive instructions from the user and operate to imitate only the movement of the user, for example.

The robot device 20 implements basic functions including, for example, a fall-prevention function and a walking function, by use of a basic application program (hereinafter, also referred to as a "basic application") that describes a control method of joint motors included in a plurality of joints. The most important thing for the robot device 20 for its movements is prevention against falling down, and the basic application includes a stabilization control application that stabilizes the posture by using a Cart-Table model and an inverted pendulum model. Being in charge of the basic functions of the robot device 20, the basic application is preferably pre-installed in the robot device 20 and may be incorporated in middleware, for example.

Application programs other than the basic application are applied application programs (hereinafter, also referred to as "applied applications") which implement additional functions such as a dance function, for example. The applied application is supplied from the server device 10, as needed, and installed in the robot device 20. The robot device 20 acquires new functions by downloading and installing a new applied application. A synchronization application for moving in synchronization with the movement of the user is installed in the robot device 20 of the embodiment, as one of the applied applications. When the synchronization application is executed, the robot device 20 performs a synchronized motion to imitate the movement of the user. In the embodiment, the synchronized motion means a motion in which the robot device 20 takes a posture equal to or similar to the estimated posture of the user.

Figure 2:
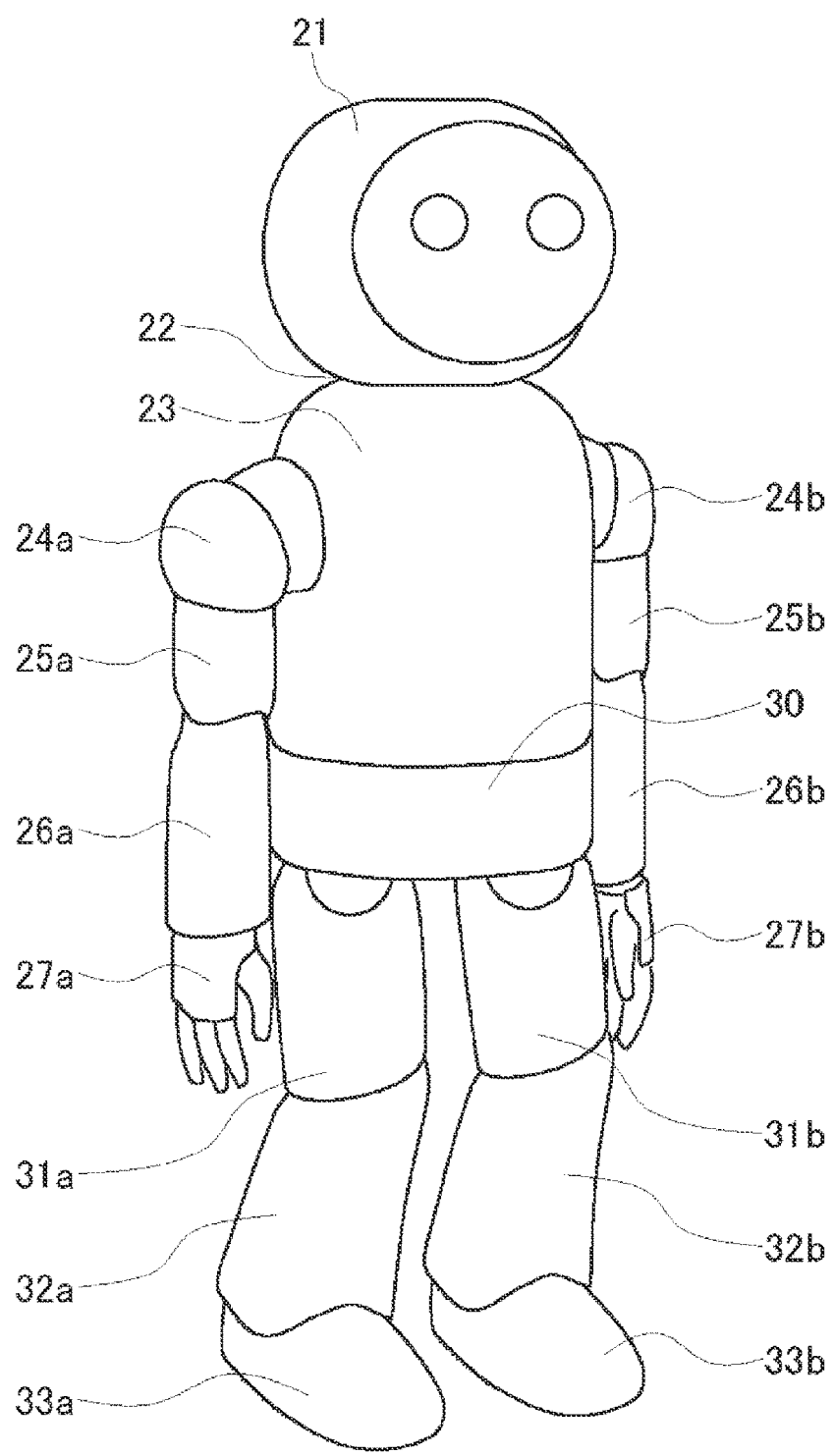
FIG. 2 is a diagram illustrating an appearance of a robot device.

FIG. 2 illustrates an appearance of the robot device 20. The robot device 20 preferably includes parts and joints similar to those of a human being and has a structure capable of taking the same posture as or a similar posture to that of a human being. The robot device 20 includes an upper body and a lower body. The lower body includes a lumbar part 30 and a right thigh 31a, a left thigh 31b, a right lower leg 32a, a left lower leg 32b, a right foot 33a, and a left foot 33b which are parts below the lumbar part 30. The upper body includes parts above the lumbar part 30, more specifically, a head 21, a neck 22, a torso 23, a right shoulder 24a, a left shoulder 24b, a right upper arm 25a, a left upper arm 25b, a right forearm 26a, a left forearm 26b, a right hand 27a, and a left hand 27b. Joint motors included in joint portions are arranged between adjacent parts, and the joint motors are connected by a link mechanism.

Figure 3:
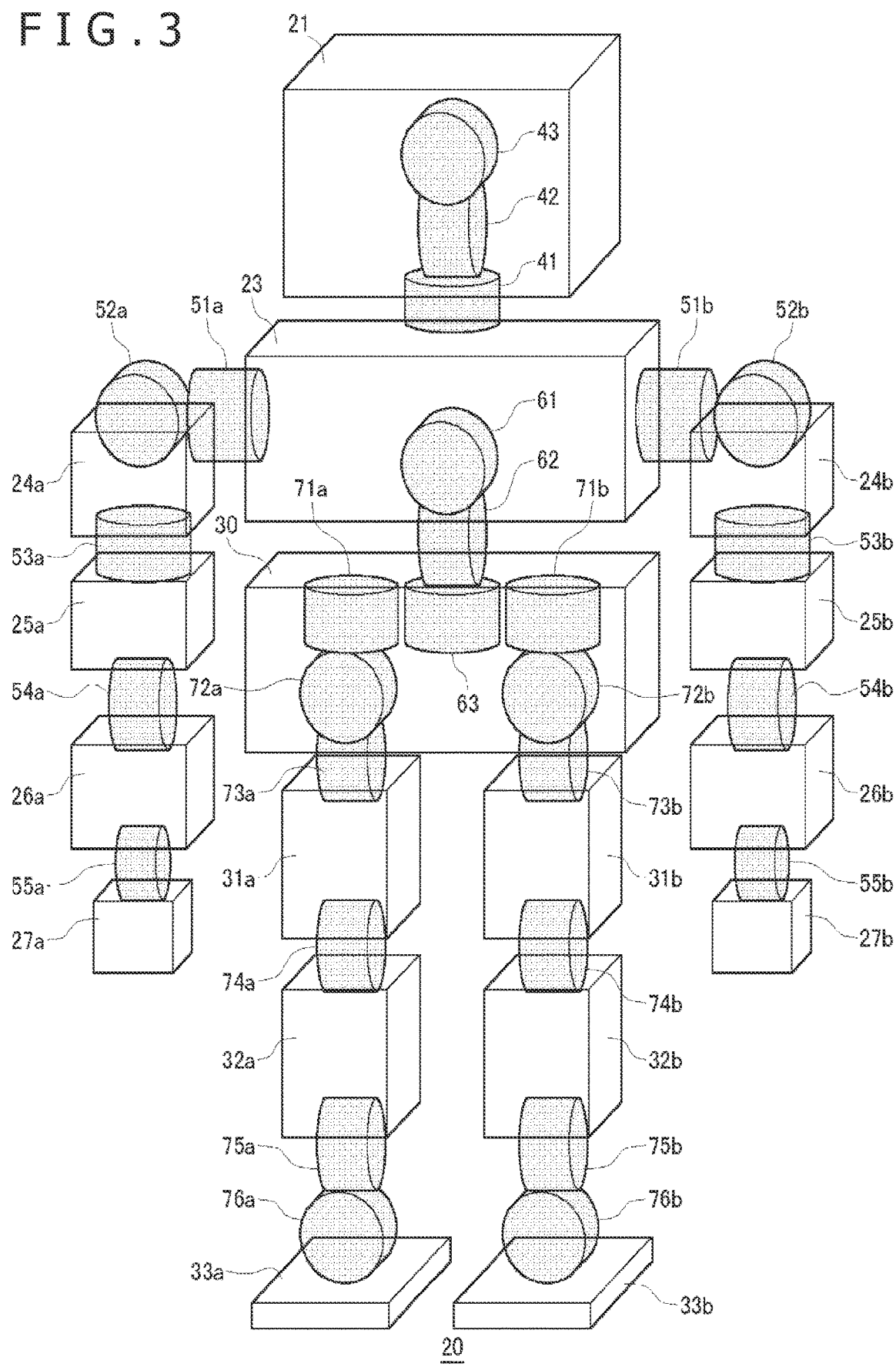
FIG. 3 is a diagram schematically illustrating joint structures included in the robot device.

FIG. 3 schematically illustrates joint structures included in the robot device 20. In order for the robot device 20 to take the same as or a similar posture to that of the user, the joint structure of the robot device 20 is preferably the same as or similar to the human joint structure. The neck joint that supports the head 21 with respect to the torso 23 includes a neck joint yaw axis motor 41, a neck joint pitch axis motor 42, and a neck joint roll axis motor 43.

A shoulder joint pitch axis motor 51a, a shoulder joint roll axis motor 52a, and a shoulder joint yaw axis motor 53a that are included in the right shoulder joint, an elbow joint pitch axis motor 54a included in the right elbow joint, and a wrist joint pitch axis motor 55a included in the right wrist joint are provided between the torso 23 and the right hand 27a. A shoulder joint pitch axis motor 51b, a shoulder joint roll axis motor 52b, and a shoulder joint yaw axis motor 53b that are included in the left shoulder joint, an elbow joint pitch axis motor 54b included in the left elbow joint, and a wrist joint pitch axis motor 55b included in the left wrist joint are provided between the torso 23 and the left hand 27b. Incidentally, the wrist joint may further be provided with a roll axis motor in order to ensure a structure more similar to that of the human joint.

A trunk roll axis motor 61, a trunk pitch axis motor 62, and a trunk yaw axis motor 63 that are included in a trunk joint are provided between the torso 23 and the lumbar part 30. In FIG. 3, while the trunk yaw axis motor 63 is arranged in the lumbar part 30 included in the lower body, the trunk yaw axis motor 63 is treated as a joint motor for controlling the posture of the upper body in the posture control according to the embodiment.

The motors disposed in the region from the lumbar part 30 to the right foot 33a and the left foot 33b are joint motors for controlling the posture of the lower body. A hip joint yaw axis motor 71a, a hip joint roll axis motor 72a, and a hip joint pitch axis motor 73a that are included in the right hip joint, a knee joint pitch axis motor 74a included in the right knee joint, and an ankle joint pitch axis motor 75a and an ankle joint roll axis motor 76a that are included in the right ankle joint are provided between the lumbar part 30 and the right foot 33a. A hip joint yaw axis motor 71b, a hip joint roll axis motor 72b, and a hip joint pitch axis motor 73b that are included in the left hip joint, a knee joint pitch axis motor 74b included in the left knee joint, and an ankle joint pitch axis motor 75b and an ankle joint roll axis motor 76b that are included in the left ankle joint are provided between the lumbar part 30 and the left foot 33b.

Figure 4:
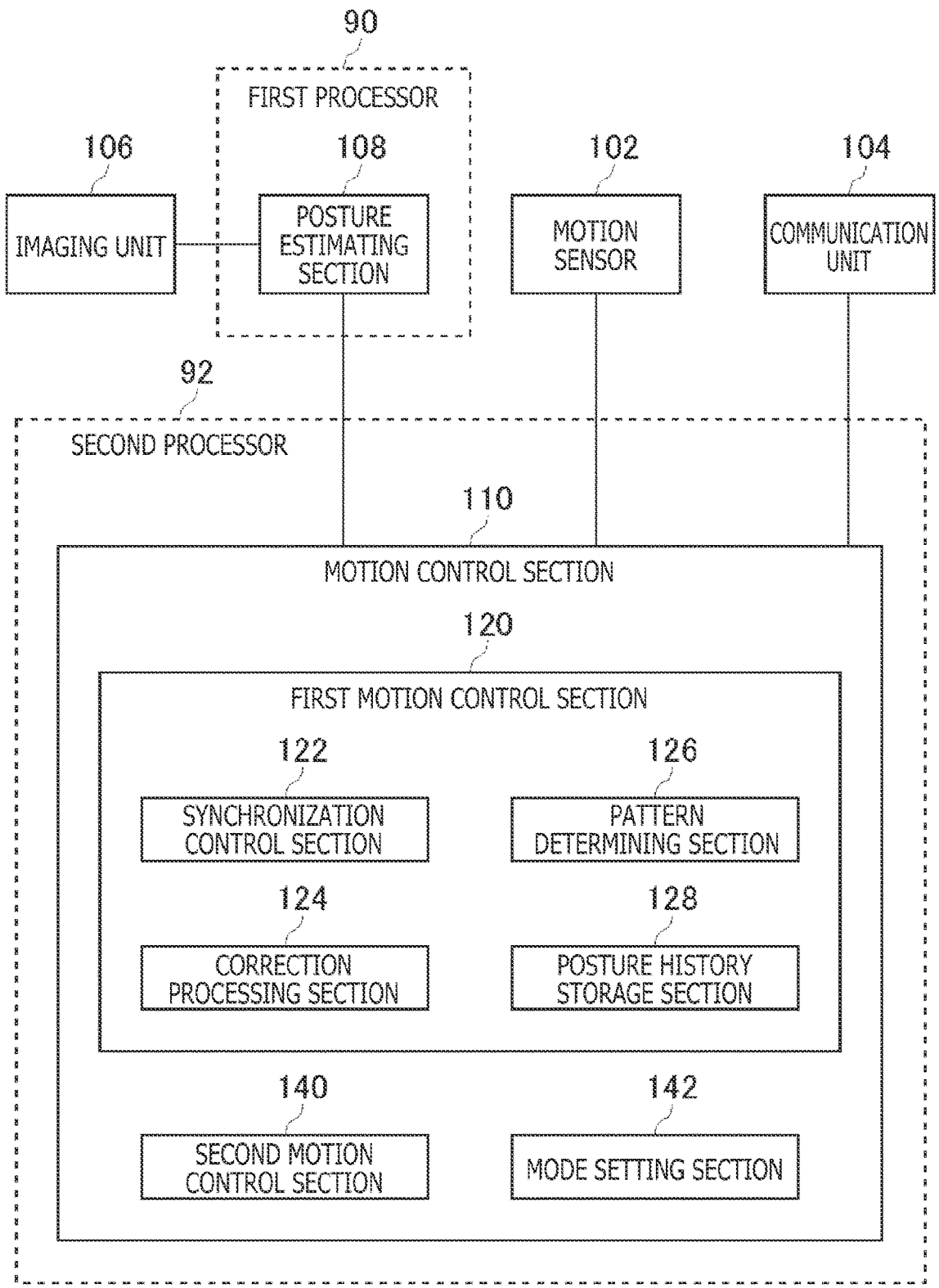
FIG. 4 is a diagram illustrating a hardware configuration of a robot control system.

FIG. 4 illustrates the hardware configuration of a robot control system 100 that controls the robot device 20. The robot control system 100 is provided in the housing of the robot device 20 and includes a motion sensor 102, a communication unit 104, an imaging unit 106, a first processor 90, and a second processor 92. The first processor 90 has a posture estimating section 108 that accomplishes a posture estimation function. The second processor 92 has a motion control section 110 that accomplishes a motion control function of the robot device 20. The motion control section 110 includes a first motion control section 120, a second motion control section 140, and a mode setting section 142. The first motion control section 120 includes a synchronization control section 122, a correction processing section 124, a pattern determining section 126, and a posture history storage section 128.

In terms of hardware components, the configuration of the robot control system 100 is achieved by a central processing unit (CPU), a memory, programs loaded in the memory, a storage, and the like of any computer. It should be understood by those skilled in the art that the first processor 90 and the second processor 92 have the illustrated functional blocks and that these functional blocks can be materialized in various ways by hardware only, software only, or a combination thereof.

The communication unit 104 is connected to the AP 3 via a wireless local area network (LAN) and communicates with the server device 10 via the AP 3. The communication unit 104 can download applied applications and patch files from the server device 10. The communication unit 104 has an ad hoc communication function, and in a space where there are a plurality of robot devices 20, the robot devices 20 can be connected with each other by ad hoc communication.

The motion sensor 102 has a three-axis acceleration sensor and a three-axis gyro sensor. The motion sensor 102 is disposed on the lumbar part 30 and provides the motion control section 110 with sensor data indicating a position and posture in a three-dimensional space and/or sensor data indicating a change in a position and posture. Further, the motion sensor 102 may be disposed at each joint portion and provide the sensor data to the motion control section 110.

The imaging unit 106 is an RGB color sensor and supplies RGB image data obtained by capturing an image in a predetermined cycle period (for example, 1/60 second), to the posture estimating section 108. The RGB image data of the embodiment is two-dimensional image data having no depth information. Note that the imaging unit 106 may be another type of image sensor. The imaging unit 106 is disposed on the head 21 and captures images in the direction in which the face of the robot device 20 is turned. A plurality of imaging units 106 may be disposed on the head 21 in order to capture not only images in the direction in which the face is turned but also images in the lateral direction and the rear direction of the face. When the synchronization application is executed in the robot device 20, the robot device 20 performs a synchronized motion that imitates the movement of the user whose images are captured by the imaging unit 106.

In one operation mode of the synchronization application, the robot device 20 faces the user and imitates the movement of the user whose images are captured by the imaging unit 106, in the state of facing the user. At this time, the robot device 20 copies the user's movement in a bilaterally symmetric manner. For example, when the user raises the right hand, the robot device 20 raises the left hand, and when the user waves the right hand left and right, the robot device 20 waves the left hand right and left. When being viewed from the user, the robot device 20 moves similarly to a user reflected in a mirror, and such an operation mode is thus called a "mirroring mode."

In another operation mode of the synchronization application, the robot device 20 basically makes the same movement as a user. In this operation mode, when the user raises the right hand, the robot device 20 raises the right hand, and when the user waves the right hand left and right, the robot device 20 waves the right hand left and right. This operation mode is used in a scene in which two users operate their respective robot devices 20 to play against each other. For example, in the case where two robot devices 20 box each other, when the user throws a right straight punch, the robot device 20 throws a right straight punch toward the opponent robot device 20, and when the user throws a left hook, the robot device 20 throws a left hook toward the opponent robot device 20. Further, when the user turns the right arm counterclockwise in a horizontal plane around the body while causing the robot device 20 to hold an object (weapon such as a sword) in the right hand 27a, the robot device 20 makes a movement to turn the object counterclockwise in the horizontal plane around the body so as to hit the tip of the object against the opponent robot device 20. Such an operation mode is called a "battle mode."

In this way, the synchronization application has a plurality of prepared operation modes. After selecting the operation mode according to the usage scene, the user causes the robot device 20 to perform a synchronized motion. Any means can be used to select the operation mode. For example, the robot device 20 may be provided with buttons for selecting an operation mode, or the robot device 20 having a voice recognition function may recognize the voice of the user indicating the operation mode, to identify the indicated operation mode. In addition, the operation mode may be automatically selected by another application such as a game. When the mode setting section 142 receives the selected operation mode, the first motion control section 120 and the second motion control section 140 control the motion of the robot device 20 in the selected operation mode.

As a prerequisite for implementation of the synchronization application, the robot device 20 needs to recognize the posture of the user. Therefore, the posture estimating section 108 acquires the RGB image data in which the user's image is recorded, and estimates the user's posture. Note that the posture estimating section 108 may estimate the user's posture not only from the RGB image data but also from another type of image data in which the user's image is recorded. The posture estimating section 108 may have a neural network that estimates the posture of a person by using a machine-learned model.

In recent years, a library for estimating the posture of a person has been released as an open source. This library detects feature points such as human joint positions from a two-dimensional image by using a neural network subjected to deep learning, and estimates the posture of a person by connecting the feature points. In a certain posture estimation model, the positions of 25 feature points are estimated for each person. The 25 feature points include a nose, a neck, a right shoulder, a right elbow, a right wrist, a left shoulder, a left elbow, a left wrist, a central waist, a right waist, a right knee, a right foot, a left waist, a left knee, a left foot, a right eye, a left eye, a right ear, a left ear, a left big toe, a left little toe, a left heel, a right big toe, a right little toe, and a right heel. The posture estimating section 108 of the embodiment estimates the posture of the person whose image has been captured, by using such a posture estimation model.

The posture estimating section 108 of the embodiment estimates the positions of 25 feature points from the two-dimensional image data in which the image of the person is recorded, and estimates the posture of the person by using these feature points. To be specific, the posture estimating section 108 estimates the position and orientation of each part of the person such as the torso, the legs, the arms, and the hands in the three-dimensional space, and supplies posture information representing the estimated posture of the person, to the motion control section 110.

The posture estimating section 108 supplies the motion control section 110 with information indicating the angle of the human joint and the orientation of the body, as the posture information representing the posture of the person, and may also supply the information regarding the relative positions of the feature points in the three-dimensional space (three-dimensional coordinates), as the posture information. Further, the posture estimating section 108 first estimates the position information of 25 feature points in the two-dimensional image, and the position information of these feature points may be supplied to the motion control section 110 as the posture information because the position information (two-dimensional coordinates) of these feature points is also posture information representing the posture of a person. In this case, the motion control section 110 needs to have a function of estimating the posture of a person in a three-dimensional space from the two-dimensional coordinates of a plurality of feature points.

Figure 5:
FIG. 5 illustrates diagrams of feature points detected by a posture estimating section.
Figure 5:

FIG. 5(a) illustrates an example of the feature points detected by the posture estimating section 108. The posture estimating section 108 estimates the positions of 25 feature points and estimates the posture of the user whose images have been captured. In the embodiment, the imaging unit 106 captures the images of the user who is the owner of the robot device 20. Before the start of the synchronized motion, an image of the user taking the reference posture illustrated in FIG. 5(a) is captured, and the posture estimating section 108 calculates the length of each part of the body to hold the length, from the feature points detected on the user who takes the reference posture. Each part is represented by a straight line connecting two feature points, and this straight line is called a "bone." The reference posture is an upright posture in which the user faces the imaging unit 106, and the length of the bone representing each part basically has a maximum value in the facing posture. The posture estimating section 108 holds the length of each bone detected when the reference posture is taken, as the "maximum bone length." Note that, when the user approaches the imaging unit 106, the detected bone length exceeds the maximum bone length. In such a case, the detected bone length is updated as the maximum bone length. At this time, the relative ratio of the bone lengths may be determined in advance, and the maximum bone length may be updated according to the relative ratio. In the following description, it is assumed that the distance between the user and the imaging unit 106 does not change and the maximum bone length is fixed, for convenience.

FIG. 5(b) illustrates another example of the feature points detected by the posture estimating section 108. In the captured image illustrated in FIG. 5(b), an image of the user who swings his right hand upward from the reference posture is captured. As compared with FIG. 5(a), the detection positions of the right elbow and the right hand are significantly changed, and therefore, the bone length of the right upper arm and the bone length of the right forearm are shorter than those in the reference posture. The posture estimating section 108 estimates the angle of a human joint on the basis of the bone length.

The posture estimating section 108 calculates the depth by the following equation.

$$Z = \sqrt{(\text{maximum bone length})^2 - (\text{bone length})^2} \quad \text{Math. 1}$$

Because of the structure of the human body, the anteroposterior relation between the two joints when viewed from the imaging unit 106 may be determined according to the following criteria.

The elbow joint is in front of the shoulder joint
The wrist joint is in front of the elbow joint
The knee joint is in front of the hip joint
The knee joint is in front of the ankle joint
The knee joint is in front of the heel Here, "front" means a position closer to the imaging unit 106.

The posture estimating section 108 estimates the positions of the feature points in the three-dimensional space and estimates the vector (bone vector) obtained by connecting the feature points in the three-dimensional space, by using the reference of the anteroposterior relation and the calculated depth. The posture estimating section 108 estimates the angle of each joint of the user, that is, the pitch angle, the roll angle, and the yaw angle of each joint of the user, by projecting the bone vector in the three-dimensional space onto the two-dimensional plane.

At this time, the posture estimating section 108 preferably estimates the joint angle of the user that corresponds to the joint structure of the robot device 20. For example, since the shoulder joint of the robot device 20 has the respective joint motors for the pitch axis, the roll axis, and the yaw axis, the posture estimating section 108 estimates the pitch angle, the roll angle, and the yaw angle of the human shoulder joint. Further, since the elbow joint of the robot device 20 has the joint motor for the pitch axis, the posture estimating section 108 estimates the pitch angle of the human elbow joint. In any case, the posture estimating section 108 preferably generates posture information to be used in the synchronization control by the motion control section 110.

Incidentally, whether the torso of the human is facing the right side or the left side with respect to the imaging unit 106 is derived as follows.

Figure 6:
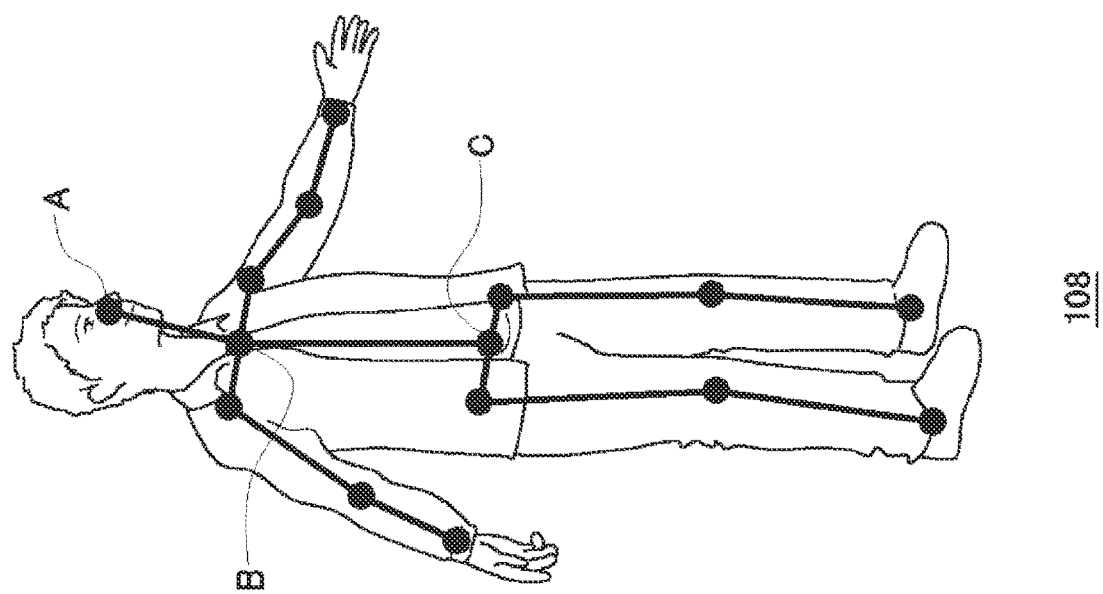
FIG. 6 illustrates diagrams of feature points detected by the posture estimating section.
Figure 6:
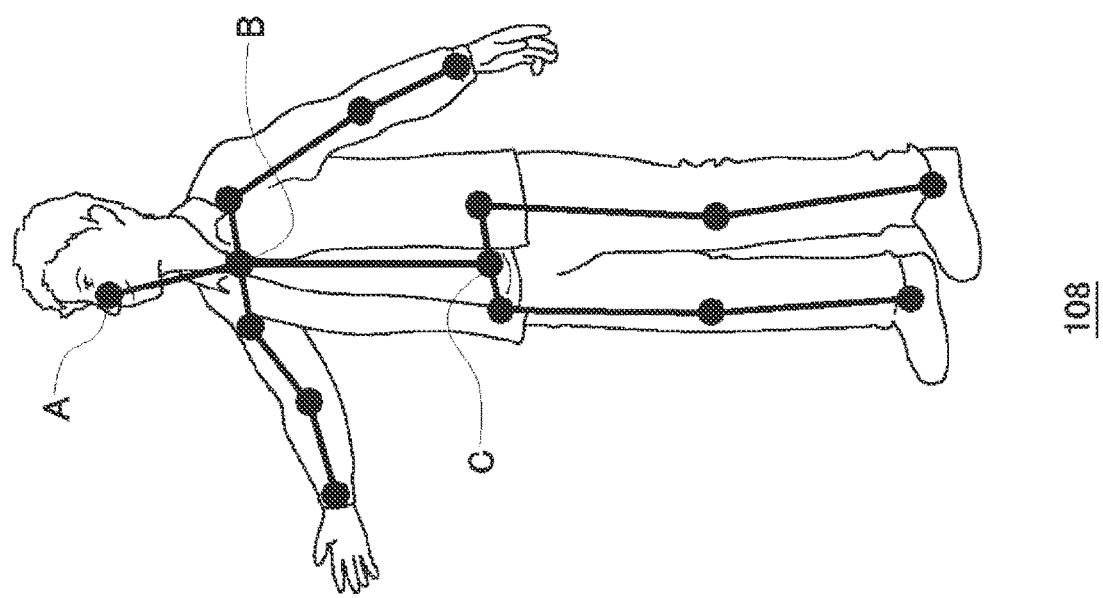

FIG. 6 illustrates the feature points detected from the captured image of the user. It should be noted that some feature points are not illustrated. FIG. 6(a) illustrates a state in which the user faces the right side with respect to the imaging unit 106, and FIG. 6(b) illustrates a state in which the user faces the left side with respect to the imaging unit 106.

The posture estimating section 108 estimates the orientation of the torso on the basis of a feature point A of the user's face, a feature point B located below the face, and a feature point C located below the feature point B. Here, the feature points A, B, and C are the feature points that are linearly arranged from the top to the bottom when the reference posture (upright posture facing the imaging unit 106) is taken. Here, the feature point A is the nose, the feature point B is the neck, and the feature point C is the central waist. The posture estimating section 108 determines whether the torso is facing the right side or the left side, on the basis of the line connecting the feature points A, B, and C.

To be specific, the posture estimating section 108 may estimate the orientation of the torso of the human on the basis of the outer product of the two-dimensional bone vector connecting the feature point B and the feature point A and the two-dimensional bone vector connecting the feature point B and the feature point C. In the case where the outer product of the two bone vectors is positive, the torso is determined to be facing the right side with respect to the imaging unit 106, and in the case where the outer product is negative, the torso is determined to be facing the left side with respect to the imaging unit 106.

The posture estimating section 108 of the embodiment supplies the motion control section 110 with at least the angle information of the human joint as posture information representing the posture of the person. The posture estimating section 108 may supply the motion control section 110 with information indicating the orientation of the torso and three-dimensional coordinates of the feature points as posture information. Further, the posture estimating section 108 may supply, as posture information, the two-dimensional coordinates of the feature points to the motion control section 110 as posture information.

The motion control section 110 controls the motion of the robot device 20 on the basis of the estimation result of the posture estimating section 108. The motion control section 110 derives the rotation speed of each joint motor and supplies a rotation instruction to the microcomputer corresponding to each joint motor.

The synchronization control section 122 of the first motion control section 120 synchronizes the posture of the upper body of the robot device 20 with the estimated posture of the upper body of the user. The upper body of the user is the part above the waist. In the joint structure illustrated in FIG. 3, the motors included in the upper body joint of the robot device 20 are the neck joint yaw axis motor 41, the neck joint pitch axis motor 42, the neck joint roll axis motor 43, the shoulder joint pitch axis motor 51a, the shoulder joint roll axis motor 52a, the shoulder joint yaw axis motor 53a, the elbow joint pitch axis motor 54a, the wrist joint pitch axis motor 55a, the shoulder joint pitch axis motor 51b, the shoulder joint roll axis motor 52b, the shoulder joint yaw axis motor 53b, the elbow joint pitch axis motor 54b, the wrist joint pitch axis motor 55b, the trunk roll axis motor 61, the trunk pitch axis motor 62, and the trunk yaw axis motor 63.

The function of the first motion control section 120 is implemented by executing the synchronization application. The synchronization control section 122 controls the joint motor of the upper body of the robot device 20 on the basis of the estimated posture of the upper body of the user, and synchronizes the posture of the upper body of the robot device 20 with the posture of the upper body of the user. It is sufficient if the synchronized posture is a posture similar to the extent that the user can understand the robot device 20 is imitating user's own movement when seeing the posture of the robot device 20.

In order to synchronize the posture of the robot device 20 with the posture of the user, the synchronization control section 122 holds a calculation rule that defines an arithmetic expression for calculating the target angle of each of the plurality of joints of the robot device 20 by using the posture information of the human body. The synchronization control section 122 determines the target angle of each of the plurality of joints of the robot device 20 by using the information regarding the posture of the person estimated by the posture estimating section 108, on the basis of the arithmetic expression defined in the calculation rule, and drives the joint motor according to the target angle. As a result, the posture of the robot device 20 is synchronized with the posture of the user.

The arithmetic expression is set to output the target angle of the joint of the robot device 20 when the posture information of the person is input thereto. In the simplest example, when the joint angle information of the right elbow of a person is input to the arithmetic expression, the arithmetic expression outputs the target angle of the right elbow joint of the robot device 20. Since the target angle is equal to or close to the estimated human joint angle, the synchronized motion of the robot device 20 is implemented.

On the other hand, the second motion control section 140 performs stabilization control of the lower body of the robot device 20 and does not perform synchronization control based on the above arithmetic expression. That is, the second motion control section 140 does not synchronize the posture of the lower body of the robot device 20 with the posture of the lower body of the user. In the joint structure illustrated in FIG. 3, the motors included in the lower body joints are the hip joint yaw axis motor 71*a*, the hip joint roll axis motor 72*a*, the hip joint pitch axis motor 73*a*, the knee joint pitch axis motor 74*a*, the ankle joint pitch axis motor 75*a*, the ankle joint roll axis motor 76*a*, the hip joint yaw axis motor 71*b*, the hip joint roll axis motor 72*b*, the hip joint pitch axis motor 73*b*, the knee joint pitch axis motor 74*b*, the ankle joint pitch axis motor 75*b*, and the ankle joint roll axis motor 76*b*. The function of the second motion control section 140 is implemented by executing the stabilization control application. The second motion control section 140 constantly monitors the sensor data of the motion sensor 102 to stabilize the posture such that the robot device 20 does not fall down. Incidentally, the function of the second motion control section 140 may be incorporated in the synchronization application. In the posture stabilization control, the second motion control section 140 processes the load caused by the movement of the upper body, as a disturbance element.

In this stabilization control, the second motion control section 140 determines the target height of the lumbar part 30 of the robot device 20 in the three-dimensional space on the basis of the information regarding the position of the waist of the person estimated by the posture estimating section 108. Further, the second motion control section 140 may determine the target positions of the right foot 33*a* and the left foot 33*b* of the robot device 20 on the basis of the position information of both feet of the person. As the position information of both feet of a person, the position information of the right heel and the left heel is used, for example. The second motion control section 140 may determine the target height of the lumbar part 30 of the robot device 20 on the basis of the difference between the information regarding the position of the waist of a person taking the reference posture and the information regarding the current position of the waist of the person. Note that the second motion control section 140 calculates the length of the vertical line drawn from the central waist up to the straight line connecting the positions of both feet when the reference posture is taken and when the current posture is taken, and the target height of the lumbar part 30 of the robot device 20 may be determined on the basis of the ratio of the calculated lengths.

As described above, the second motion control section 140 does not synchronize the posture of the lower body of the robot device 20 with the posture of the lower body of the user, but matches the positions of the right foot 33*a* and the left foot 33*b* and the height of the lumbar part 30 to the posture of the user, so that the robot device 20 can take a posture that resembles the lower body of the user. After determining the target positions of the right foot 33*a* and the left foot 33*b* and the target height of the lumbar part 30, the second motion control section 140 may perform inverse kinematics computation to control a plurality of joint motors included in the lower body.

Figure 7:
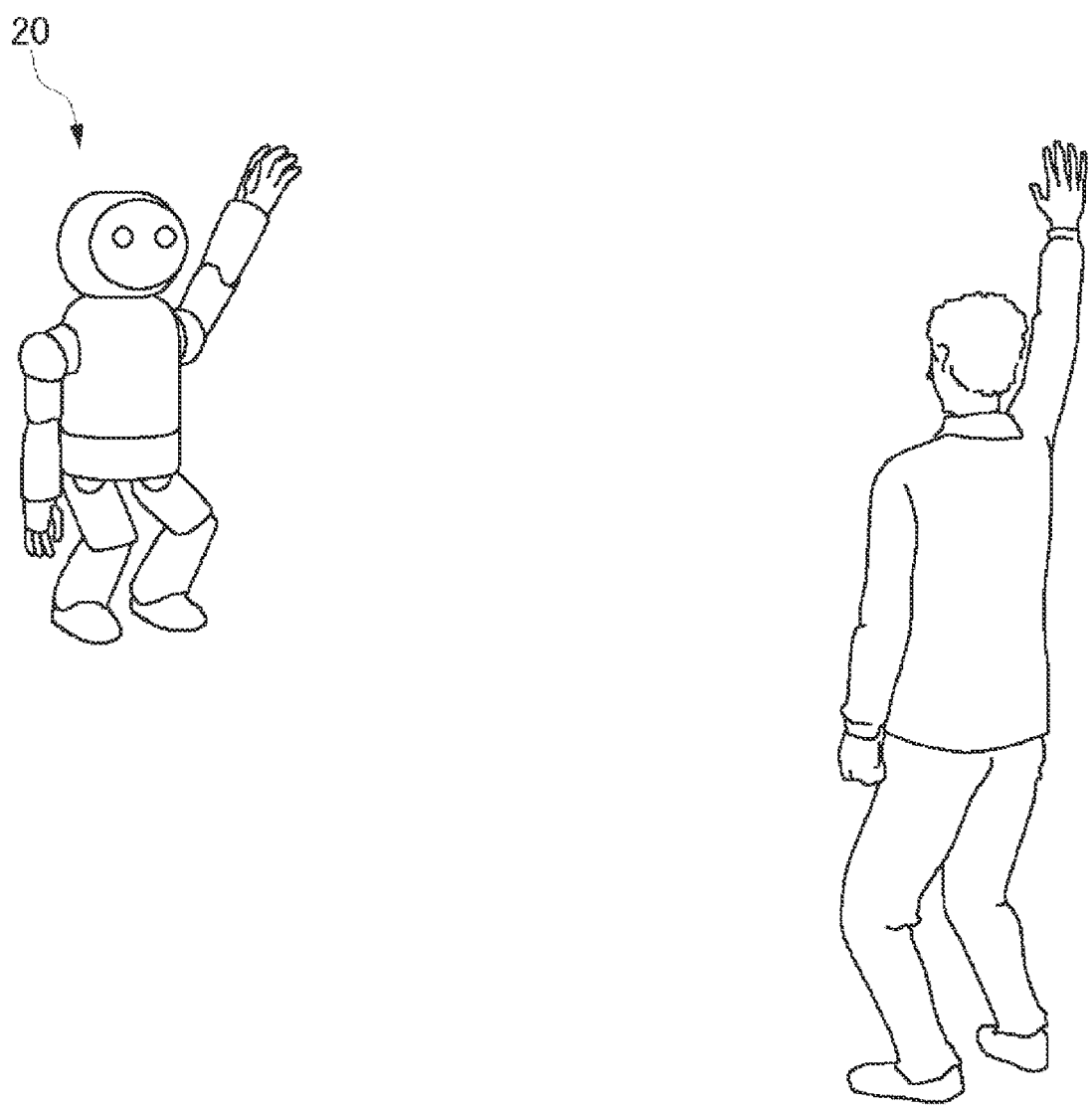
FIG. 7 is a diagram illustrating a manner in which the robot device performs a synchronized movement.

FIG. 7 illustrates how the robot device 20 performs a synchronized movement in the mirroring mode. In the example illustrated in FIG. 7, the user raises his right hand with his knees bent. The upper body of the robot device 20 is synchronized with the posture of the user's upper body by the synchronization control section 122 with respect to the user's posture. The lower body of the robot device 20 is not synchronized with the posture of the user's lower body, and the posture control is performed by the second motion control section 140 such that the robot device 20 will not fall down. The height of the lumbar part 30 of the robot device 20 is set to a height corresponding to the height of the user's waist.

Incidentally, when the present inventors conducted an operation experiment of the robot device 20 by using the detection value of the posture estimating section 108, it was found that fluctuation occurred in the detection value of the posture estimating section 108 even when the person as the subject did not move in the actual image capturing environment. Therefore, if the motion control section 110 controls and rotates the joint motor by using the detection value of the posture estimating section 108 as it is, as the frequency of the fluctuation of the detection value becomes greater, each joint continues to move more ceaselessly. Accordingly, the synchronization control section 122 determines the rotation speed of the motor of each joint by using a minimum jerk model.

Figure 8:
FIG. 8 is a diagram illustrating an example of a minimum jerk model trajectory representing joint angles.

FIG. 8 illustrates an example of a minimum jerk model trajectory representing the joint angle. The minimum jerk model is a method for obtaining a trajectory in which the rate of change in acceleration becomes small. It is understood that the trajectory can be smoothed with respect to the target angle as compared with the joint angle trajectory based on the detection value of the posture estimating section 108. By determining the rotation speed of the motor by using the minimum jerk model, the synchronization control section 122 can smooth the rotation of the joint even if the detection value of the posture estimating section 108 fluctuates.

It should be noted that, in the posture estimating section 108, various errors related to the posture, such as a detection error of the feature point position, a calculation error of the depth, and an estimation error of the joint angle, occur. In the upper body of the robot device 20, since the angle change is transmitted from the trunk joint to the shoulder joint, the elbow joint, and the wrist joint, the posture estimation error generated in the posture estimating section 108 is gradually accumulated from the trunk joint toward the wrist joint. Therefore, when all the joints are moved in a similar way, the right hand 27*a* and the left hand 27*b*, which are the distal parts, may behave violently due to the maximum accumulation of posture estimation errors. In order to avoid such behavior, the synchronization control section 122 determines the target angle of at least one joint and performs control to determine the rotation speeds of the motors included in the joint, on the basis of a target arrival time period needed to reach the determined target angle.

The posture estimating section 108 estimates the angle information of each joint of a person in a predetermined cycle period T1 (for example, 20 milliseconds) and supplies the information to the motion control section 110. Therefore, the synchronization control section 122 determines the target angle of each joint of the upper body of the robot device 20 in the same cycle period T1 on the basis of the supplied estimated angle information. That is, the synchronization control section 122 determines a new target angle of each joint in each cycle period T1 (20 milliseconds). Since this target angle includes the posture estimation error, the target angle determined in the cycle period T1 may be a discrete value in the case where the fluctuation occurs in the posture estimation error.

At this time, when the synchronization control section 122 determines the rotation speed of the joint motor such that each joint reaches a target angle in the cycle period T1, the joint closer to the distal part of the upper body has more oscillation-like behavior (violent behavior). Accordingly, the synchronization control section 122 sets a target arrival time period T2 needed to reach the determined target angle, to be longer than the cycle period T1 for determining the target angle, thereby avoiding hasty rotation of the joint and smoothing the rotation of the joint.

For example, it is assumed that the difference between the current angle and the target angle is $\alpha$. The synchronization control section 122 determines such a rotation speed of the motor as to rotate the joint by $\alpha$ degrees after the time period T2, and then rotates the joint at this rotation speed only during the time period T1. The angle of rotation during the time period T1 is ($\alpha \times$T1/T2). Therefore, in the case where T2=10$\times$T1, the amount of rotation after the time period T1 is $\alpha$/10. After the time period T1, the synchronization control section 122 determines a new target angle on the basis of the estimated angle information supplied from the posture estimating section 108, and determine such a rotation speed of the motor that the joint reaches the target angle after the time period T2 elapses from the determination of the new target angle.

The target arrival time period T2 needed to reach the target angle is set to be longer than the cycle period T1 for determining the target angle, so that the robot device 20 can smoothly follow the movement of the user although a delay of the synchronized motion occurs. Note that, although the movement of the robot device 20 becomes smoother as the target arrival time period T2 is longer than the determination cycle period T1, the delay of the synchronized motion becomes large if the target arrival time period T2 is excessively longer than the determination cycle period T1.

In order to make the user feel the delay of the synchronized motion to be small, the target arrival time period T2 needed to reach the target angle is preferably set for each joint. To be specific, the target arrival time period set for the joint on the distal side of the upper body is shorter than the target arrival time period set for the joint on the trunk side. The distal side joints, that is, the right hand 27a and the left hand 27b connected to the wrist joint, and the right forearm 26a and the left forearm 26b connected to the elbow joint move in a place away from the torso 23, and the movements thereof are easily noticed by the user. Therefore, the target arrival time period T2 for the joint on the distal end side is set to be short, so that the delay of the synchronized motion can be made to appear as small as possible.

On the other hand, for the joint on the trunk side, by setting the target arrival time period T2 to be relatively long, the influence of the posture estimation error accumulating on the distal side is reduced. As a result, the overall movement of the robot device 20 is smoothly controlled. For example, the target arrival time period T2 for the wrist joint and the elbow joint may be set to 80 milliseconds, the target arrival time period T2 for the shoulder joint on the trunk side may be set to 100 to 200 milliseconds, and the target arrival time period T2 for the trunk joint may be set to 250 milliseconds, so that a small delay and smoothness of the synchronized motion can be achieved.

It should be noted that, within the shoulder joint, it is preferable to set the target arrival time period T2 for the joint motor on the further distal side to be relatively short. Specifically, the target arrival time period T2 for the shoulder joint yaw axis motor 53a may be set to 100 milliseconds, the target arrival time period T2 for the shoulder joint roll axis motor 52a may be set to 160 milliseconds, and the target arrival time period T2 for the shoulder joint pitch axis motor 51a may be set to 200 milliseconds. That is, the target arrival time period T2 for one joint motor arranged between the trunk side and the distal end (hand) is set to be equal to or greater than the target arrival time period T2 for a joint motor on the distal side of the one joint motor, but equal to or less than the target arrival time period T2 for a joint motor on the trunk side of the one joint motor. Note that, since the fast movement of the neck joint causes a sense of discomfort, the target arrival time period T2 for the neck joint may be set to the maximum value (for example, 400 milliseconds).

Figure 9:
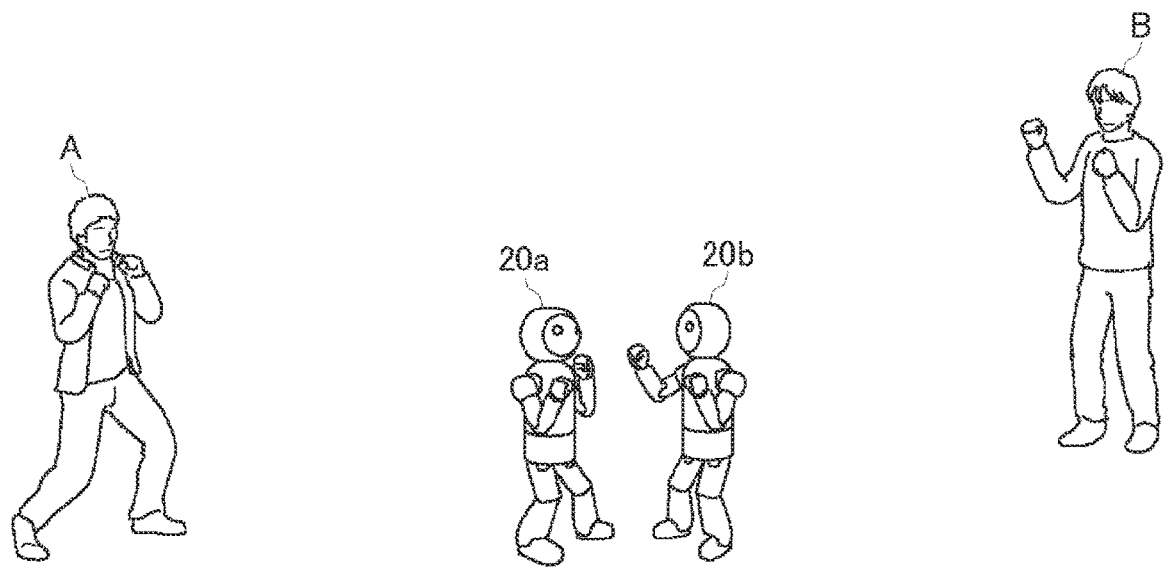
FIG. 9 is a diagram illustrating a robot system in which a plurality of robot devices play against each other.

FIG. 9 illustrates a robot system in which a plurality of robot devices are operated by respective users to play against each other. In a robot system 200, a user A operates a robot device 20a, a user B operates a robot device 20b, and the robot device 20a and the robot device 20b are made to fight against each other by boxing. In each of the robot devices 20a and 20b, a "battle mode" is set as an operation mode, and a "boxing mode" in the "battle mode" is selected. In the "boxing mode," the robot device 20 moves basically in a manner similar to the user's movement. When the user throws a right straight punch, the robot device 20 also throws a right straight punch, and when the user throws a left hook, the robot device 20 also throws the left hook.

In the robot system 200 of a fighting type, the robot devices 20 face each other, and each user does not stand in front of the face of the robot device 20. In the case where the head 21 of the robot device 20 includes a plurality of imaging units 106 that capture images in all directions, the posture estimating section 108 acquires image data obtained by capturing an image of the user by use of the imaging unit 106, to estimate the posture of the user.

In this example, in the robot device 20a, the posture estimating section 108 estimates the posture of the user A from the image data of an image captured by the imaging unit 106, and the synchronization control section 122 performs control to synchronize the posture of the robot device 20a with the posture of the user A. Further, in the robot device 20b, the posture estimating section 108 estimates the posture of the user B from the image data of an image captured by the imaging unit 106, and the synchronization control section 122 performs control to synchronize the posture of the robot device 20b with the posture of the user B. In this way, in the robot system 200, when the users A and B perform boxing movements, the robot devices 20a and 20b move by imitating the movements of the users A and B, respectively. Since the robot device 20 moves like an avatar for each user, unprecedented entertainment properties using the robot device 20 can be achieved.

Note that the robot device 20 may be supplied with image data obtained by capturing images of the user, from another external device. While staying at a place away from the robot device 20, the user transmits image data obtained by capturing user's images, from the external device to the robot device 20. In the robot device 20, the posture estimating section 108 estimates the user's posture from the received image data, and the synchronization control section 122 performs control to synchronize the posture of the robot device 20 with the user's posture. In this case, the user can implement a fight between the robot devices 20 while being in a place different from a place where the robot devices 20 are present.

Note that, in the case where the robot device 20 has only a single imaging unit 106 that captures images in the direction in which the face is turned, the robot device 20 can use the imaging unit 106 to capture user's images after turning the face toward the user while keeping the body facing an opponent robot device 20. However, in a fight between the robot devices 20, the face of each robot device 20 is not directed toward the opponent robot device 20, which causes a sense of discomfort. Therefore, the robot device 20 may estimate the posture of the user of the opponent robot device 20 and may transmit the estimated posture to the opponent robot device 20.

That is, in the robot device 20a, the imaging unit 106 captures images of the user B, the posture estimating section 108 estimates the posture of the user B, and the communication unit 104 transmits the posture information of the user B to the robot device 20b. For this transmission, ad hoc communication may be used. In the robot device 20b, the communication unit 104 receives the posture information of the user B, and the motion control section 110 executes the motion control of the robot device 20b on the basis of the posture information of the user B.

Similarly, in the robot device 20b, the imaging unit 106 captures images of the user A, the posture estimating section 108 estimates the posture of the user A, and the communication unit 104 transmits the posture information of the user A to the robot device 20a. In the robot device 20a, the communication unit 104 receives the posture information of the user A, and the motion control section 110 executes the motion control of the robot device 20a on the basis of the posture information of the user A. The robot device 20 estimates the posture of the opponent's user and transmits the data to the opponent robot device 20 in this way, and thus, the processing time can be shortened as compared with the case where each device transmits image data.

The "battle mode" includes not only the "boxing mode" of simply throwing punches but also a fighting mode with a weapon equipped. For example, there are a "three-section stick battle mode" with a three-section stick as a weapon and a "sword battle mode" with a sword as a weapon. In such a weapon battle mode, there are cases where it is better to correct the synchronized motion of the robot device 20 depending on the type of weapon. Therefore, when operating in the battle mode, the user selects an operation mode according to the weapon with which the robot device 20 is equipped, and the mode setting section 142 sets the operation mode according to the weapon to be furnished. Incidentally, if the robot device 20 has a function of automatically recognizing the weapon to be furnished, the mode setting section 142 may set an operation mode according to the automatically recognized weapon. The correction processing section 124 corrects the synchronized motion of the robot device 20 according to the set operation mode.

(a) "Three-Section Stick Battle Mode"

The three-section stick is a weapon in which three rods are connected in a straight line with strings or chains. In the case where the three-section stick is held in the right hand 27a of the robot device 20a, if the user A does not swing his right arm, the two rods other than the gripped rod will droop down limply and come in contact with the floor surface. Therefore, in the "three-section stick battle mode," the correction processing section 124 sets a lower limit for the pitch angle of the right shoulder joint, and keeps the robot device 20a in a state where the three-section stick is raised high such that the rod does not come in contact with the floor surface. Incidentally, in the case where the left hand 27b is provided with a three-section stick, it is sufficient if the correction processing section 124 sets a lower limit for the pitch angle of the left shoulder joint.

Figure 10:
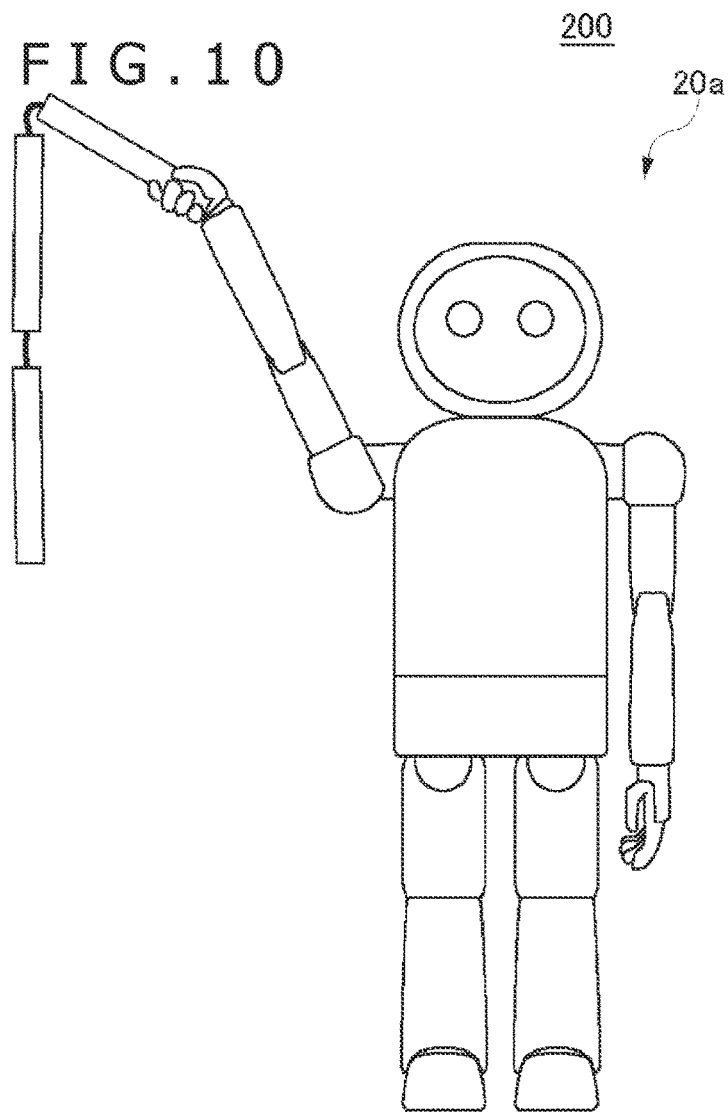
FIG. 10 is a diagram illustrating a state in which a lower limit is set for the pitch angle of a shoulder joint.

FIG. 10 illustrates a state in which the lower limit is set for the pitch angle of the shoulder joint. The lower limit angle may be determined depending on the length of the three-section stick. In the case where no lower limit is set for the pitch angle of the shoulder joint, when the arm of the user A is lowered, the three-section stick also hangs down and may be entangled with the leg. Further, if the user A turns the arm around without raising the arm sufficiently, a situation in which the three-section stick is wound around the torso of the robot device 20a may occur. Therefore, in the "three-section stick battle mode," the correction processing section 124 sets the lower limit for the pitch angle of the shoulder joint, and even if the user A turns his arm around without raising the arm so much, the robot device 20a naturally twirls the three-section stick to attack the opponent robot device 20b.

(b) "Sword Battle Mode"

In the case of causing the robot device 20a to hold a sword in the right hand 27a, the robot device 20a looks better when holding the sword at a higher position than at a lower position. If the user A raises his right upper arm to a high position, the synchronization control section 122 allows the robot device 20a to hold the sword at a high position. However, at the time of an actual trial, it was found that, since the user A did not actually hold a sword, it was difficult to give the user A a feeling of holding the sword. As a result, the user A did not raise his upper arm to a high position in the "sword battle mode." Accordingly, the correction processing section 124 corrects the synchronized motion of the robot device 20a such that the user A can cause the robot device 20a to raise the right upper arm 25a high even without raising his own right upper arm to a high position.

Figure 11:
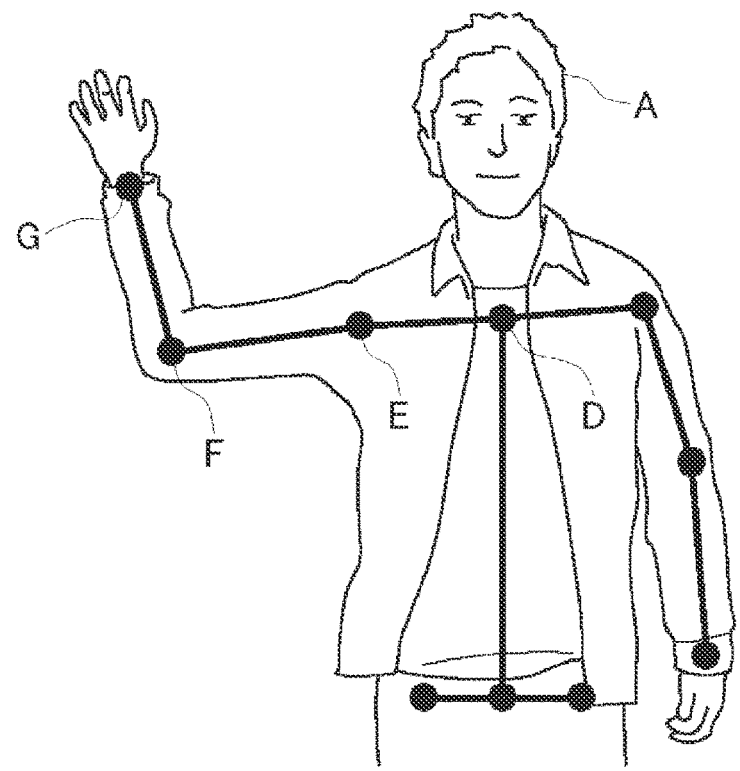
FIG. 11 illustrates diagrams of an example of feature point correction processing.
Figure 11:
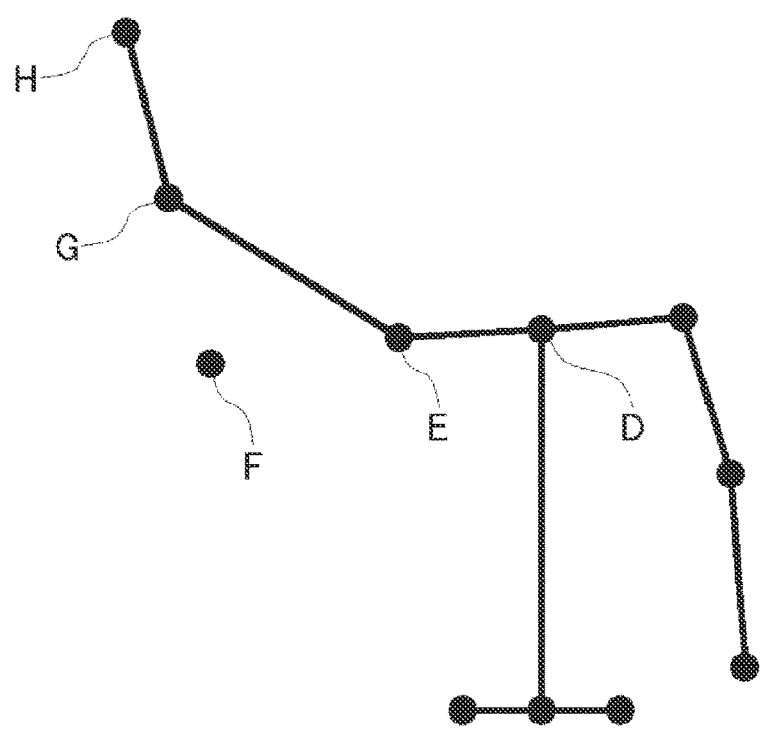

FIG. 11(a) illustrates an example of the feature points detected by the posture estimating section 108. Feature points D, E, F, and G are the neck, the right shoulder, the right elbow, and the right wrist, respectively. The synchronization control section 122 determines the target angle of the joint of the robot device 20 by use of a calculation rule that defines an arithmetic expression for calculating the target angle of each of the plurality of joints of the robot device 20 by using the posture information of the human body. Therefore, for example, in the synchronization control in the "boxing mode," the target joint angle of the right shoulder of the robot device 20 is determined by using the posture information determined from the positional relation between the feature points D, E, and F.

On the other hand, in the "sword battle mode," the correction processing section 124 corrects the synchronized motion by changing at least part of the arithmetic expression in the synchronization control. FIG. 11(b) illustrates an example of correction processing by the correction processing section 124. In this correction processing, the target joint angle of the right shoulder of the robot device 20 is determined by using the posture information determined from the positional relation between the feature points D, E, and G. Incidentally, the right wrist of the robot device 20 is calculated with reference to an end point H when the bone vector extending from the feature point F to the feature point G illustrated in FIG. 11(a) is set with the feature point G as its starting point.

In this way, the correction processing section 124 changes at least part of the calculation rule in the synchronization control to correct the target angle of the joint of the robot device 20, so that robot movement with excellent entertainment can be achieved as compared with the case of performing the synchronization control to which the calculation rule is applied as it is.

Note that the correction processing section 124 of the robot device 20a may correct the synchronized motion of the robot device 20a on the basis of the motion of the opponent robot device 20b. The correction processing section 124 acquires a captured image of the opponent from the imaging unit 106, and when it is determined that the robot device 20a is likely to receive a hit of the opponent's attack, for example, the correction processing section 124 may forcibly stop the synchronization control section 122 performing the synchronized motion and then take action to avoid being hit.

It should be noted that, since the joint structures of the human and the robot device 20 are not completely the same, the robot device 20 may not be able to accurately imitate the movement of the human. In addition, the imaging unit 106 may not be able to capture all images of the person's movement. In order to cope with such a situation, in the case where the change in the posture of the robot device 20 indicates a predetermined pattern, the correction processing section 124 may subsequently cause the robot device 20 to move in a motion pattern associated with the predetermined pattern.

The posture history storage section 128 stores the posture of the robot device 20 taken during a period from the present to a predetermined past time. It is sufficient if the posture history storage section 128 can store the posture of the robot device 20 up to approximately ten and several seconds ago, for example. The pattern determining section 126 refers to the posture stored in the posture history storage section 128 and determines whether or not the change in the posture of the robot device 20 up to the present represents the predetermined pattern. In the case where the change in the posture of the robot device 20 represents the predetermined pattern, the correction processing section 124 subsequently causes the robot device 20 to move in the motion pattern associated with the predetermined pattern. For example, in the mirroring mode, it is assumed that the user grabs an object with the right hand, turns the right arm around the right shoulder pitch axis, and then brings the right hand over the right shoulder to the back to drop an object behind the user. At this time, the imaging unit 106 cannot capture an image of the user bringing the right hand over the right shoulder to a space behind. Therefore, when the posture history storage section 128 stores information regarding a change in posture indicating that the robot device 20 has brought the arm to a space behind the ear while holding an object in the hand, the pattern determining section 126 determines that the change in posture up to the present has a predetermined pattern, and the correction processing section 124 may allow the movement to drop an object behind the back by opening the hand.

The present invention has been described with reference to the embodiment. The embodiment is an example, and it will be understood by those skilled in the art that combinations of the respective components and processing processes of the embodiment can variously be modified and that such modifications are also within the scope of the present invention. In the embodiment, the motion control section 110 synchronously controls only the upper body, but the whole body may also be synchronously controlled.

Further, in the embodiment, in the synchronization control of the upper body, described above is the method in which the synchronization control section 122 sets the target arrival time period T2 needed to reach the determined target angle, to be longer than the cycle period T1 for determining the target angle, to thereby avoid hasty rotation of the joint. Further, in the posture stabilization control of the lower body, the second motion control section 140 may similarly control the target arrival time period T2 needed to reach the target angle, to be longer than the cycle period T1 for determining the target angle. Since the sudden movement of the lower body is transmitted to the upper body, the target arrival time period T2 is preferably set to be longer than the maximum target arrival time period in the upper body, that is, the target arrival time period of the trunk joint.

INDUSTRIAL APPLICABILITY

The present invention can be used in the technical field of controlling the movement of a robot device.

REFERENCE SIGNS LIST

1: Information processing system
10: Server device
20, 20a, 20b: Robot device
100: Robot control system
102: Motion sensor
104: Communication unit
106: Imaging unit
108: Posture estimating section
110: Motion control section
120: First motion control section
122: Synchronization control section
124: Correction processing section
126: Pattern determining section
128: Posture history storage section
140: Second motion control section
142: Mode setting section
200: Robot system

The invention claimed is:

1. A robot control system that controls a robot device having an upper body and a lower body, the lower body including a lumbar part and a plurality of movable legs, the robot control system comprising:
   a posture estimating circuit that acquires image data in which an image of a person is recorded, and estimates a posture of the person; and
   a motion control circuit that controls a motion of the robot device on a basis of an estimation result of the posture estimating circuit, wherein
   the motion control circuit includes
   a first motion control circuit that synchronizes a posture of the upper body of the robot device with a posture of an upper body of the person estimated by the posture estimating circuit, and
   a second motion control circuit that controls and stabilizes the lower body of the robot device,
   wherein the second motion control circuit determines a target height of the lumbar part of the robot device in a three-dimensional space on a basis of information regarding a position of a waist of the person whose posture is estimated by the posture estimating circuit.

2. The robot control system according to claim 1, wherein the upper body of the robot device is a portion above the lumbar part of the robot device.

3. The robot control system according to claim 1, wherein the posture estimating circuit estimates information regarding positions of a plurality of feature points of the person, from the image data, and estimates an angle of a joint of the person on a basis of the information regarding the positions of the plurality of feature points.

4. The robot control system according to claim 3, wherein the posture estimating circuit estimates the angle of the joint of the person on a basis of a length of a straight line connecting the plurality of feature points.

5. The robot control system according to claim 1, wherein the posture estimating circuit estimates an orientation of a torso of the person on a basis of a first feature point of a face, a second feature point located below the face, and a third feature point located below the second feature point.

6. The robot control system according to claim 5, wherein the posture estimating circuit estimates the orientation of the torso of the person on a basis of an outer product of a vector connecting the second feature point and the first feature point and a vector connecting the second feature point and the third feature point.

7. The robot control system according to claim 1, wherein the motion control circuit determines a target angle of at least one joint of the robot device and performs control to determine a rotation speed of a motor included in the joint, on a basis of a target arrival time period needed to reach the determined target angle.

8. The robot control system according to claim 7, wherein the robot device includes a plurality of joints, and the target arrival time period needed to reach the target angle is set for each of the plurality of joints.

9. The robot control system according to claim 8, wherein one joint includes a plurality of motors, and the target arrival time period needed to reach the target angle is set for each of the plurality of motors.

10. The robot control system according to claim 8, wherein the target arrival time period set for a joint on a distal side of the upper body is shorter than the target arrival time period set for a joint on a trunk side.

11. The robot control system according to claim 10, wherein the target arrival time period set for an elbow joint is shorter than the target arrival time period set for a shoulder joint.

12. The robot control system according to claim 8, wherein, on a basis of an arithmetic expression for calculating a target angle of each of the plurality of joints of the robot device by using posture information of a human body, the first motion control circuit uses information regarding the posture of the person estimated by the posture estimating circuit, to determine target angles of the plurality of joints of the robot device and cause the robot device to perform a synchronized motion.

13. A robot control system that controls a robot device having an upper body and a lower body, the lower body including a lumbar part and a plurality of movable legs, the robot control system comprising:
   a posture estimating circuit that acquires image data in which an image of a person is recorded, and estimates a posture of the person, wherein the posture estimating circuit estimates information regarding positions of a plurality of feature points of the person, from the image data, and estimates an angle of a joint of the person on a basis of the information regarding the positions of the plurality of feature points; and
   a motion control circuit that controls a motion of the robot device on a basis of an estimation result of the posture estimating circuit, wherein
   the motion control circuit includes
      a first motion control circuit that synchronizes a posture of the upper body of the robot device with a posture of an upper body of the person estimated by the posture estimating circuit, and
      a second motion control circuit that controls and stabilizes the lower body of the robot device, and
   wherein the motion control circuit determines a target angle of at least one joint of the robot device on a basis of the estimated angle of the joint of the person and performs control to determine a rotation speed of a motor included in the joint, on a basis of a target arrival time period needed to reach the determined target angle.

* * * * *